(12) United States Patent
Kesler

(10) Patent No.: US 11,048,700 B1
(45) Date of Patent: *Jun. 29, 2021

(54) DECOMPOSITION OF QUERIES

(71) Applicant: INTUIT INC., Mountain View, CA (US)

(72) Inventor: Grigoriy Kesler, Mountain View, CA (US)

(73) Assignee: INTUIT, INC., Mountain View, CA (US)

(*) Notice: Subject to any disclaimer, the term of this patent is extended or adjusted under 35 U.S.C. 154(b) by 127 days.

This patent is subject to a terminal disclaimer.

(21) Appl. No.: 16/525,805

(22) Filed: Jul. 30, 2019

Related U.S. Application Data

(63) Continuation of application No. 15/417,809, filed on Jan. 27, 2017, now Pat. No. 10,409,811.

(51) Int. Cl.
| | |
|---|---|
| *G06F 16/2453* | (2019.01) |
| *G06F 16/2455* | (2019.01) |
| *G06F 16/901* | (2019.01) |
| *G06F 16/242* | (2019.01) |

(52) U.S. Cl.
CPC .... *G06F 16/24537* (2019.01); *G06F 16/2425* (2019.01); *G06F 16/2456* (2019.01); *G06F 16/24564* (2019.01); *G06F 16/9024* (2019.01)

(58) Field of Classification Search
CPC ........... G06F 16/24537; G06F 16/9024; G06F 16/2425; G06F 16/24564; G06F 16/2456
See application file for complete search history.

(56) References Cited

U.S. PATENT DOCUMENTS

| | | | | |
|---|---|---|---|---|
| 5,295,256 | A * | 3/1994 | Bapat | G06F 16/289 717/137 |
| 2004/0049509 | A1* | 3/2004 | Keller | G06Q 10/00 |
| 2007/0073853 | A1* | 3/2007 | Azizi | G06F 16/283 709/220 |
| 2010/0169381 | A1* | 7/2010 | Faunce | G06F 16/24534 707/797 |

(Continued)

OTHER PUBLICATIONS

Gadea et al., "A reference architecture for real-time microservice API consumption", CrossCloud '16: Proceedings of the 3rd Workshop on CrossCloud Infrastructures & PlatformsApr. 2016 Article No. 2 pp. 1-6 (Year: 2016).*

*Primary Examiner* — Mark D Featherstone
*Assistant Examiner* — Kweku William Halm
(74) *Attorney, Agent, or Firm* — Patterson + Sheridan, LLP

(57) ABSTRACT

Techniques are disclosed to decompose a query from a client application. Embodiments include receiving a query based on a request provided by a user via a user interface. Embodiments include identifying a set of data elements requested by the query and identifying a predicate expression of a plurality of expressions in the query and a dependent expression of the plurality of expressions in the query. Embodiments include generating a first micro-service query for at least a first data element corresponding to the predicate expression and a second micro-service query for at least a second data element corresponding to the dependent expression. Embodiments include determining an order for issuing the first micro-service query and the second micro-service query based on the predicate expression and the dependent expression.

20 Claims, 6 Drawing Sheets

(56) References Cited

U.S. PATENT DOCUMENTS

| | | | | |
|---|---|---|---|---|
| 2010/0293301 A1* | 11/2010 | Amini | ............... | G06F 9/544 |
| | | | | 710/12 |
| 2011/0040745 A1* | 2/2011 | Zaydman | ............. | G06F 16/284 |
| | | | | 707/714 |
| 2013/0091491 A1* | 4/2013 | Koutyrine | ............... | G06F 8/73 |
| | | | | 717/123 |
| 2013/0138473 A1* | 5/2013 | Balko | ............... | G06Q 10/04 |
| | | | | 705/7.27 |
| 2013/0139164 A1* | 5/2013 | Balko | ............... | G06F 8/41 |
| | | | | 718/102 |
| 2013/0204940 A1* | 8/2013 | Kinsel | ............... | G06Q 50/01 |
| | | | | 709/204 |
| 2014/0215574 A1* | 7/2014 | Erb | ............... | H04L 63/10 |
| | | | | 726/4 |
| 2015/0052021 A1* | 2/2015 | Elias | ............... | G06Q 30/0627 |
| | | | | 705/26.63 |
| 2015/0347510 A1* | 12/2015 | Luo | ............... | G06F 16/2455 |
| | | | | 707/719 |
| 2017/0060948 A1* | 3/2017 | Ma | ............... | G06F 16/2246 |
| 2017/0242784 A1* | 8/2017 | Heorhiadi | ............ | G06F 11/3692 |
| 2017/0331791 A1* | 11/2017 | Wardell | ............ | H04L 63/0281 |

* cited by examiner

300

```
SELECT id, amount, txnDate, contact.displayName, account.name
FROM Invoice
WHERE amount > 100
  AND
      contact.displayName LIKE 'Grey'
```

330

```
(1) SELECT id, displayName FROM Contact WHERE displayName LIKE 'Grey'
(2) SELECT id, amount, txnDate, contact.id, account.id FROM Invoice
    WHERE amount > 100 AND contact.id IN (<contact ids retrieved by query (1)>)
(3) SELECT id, name FROM LedgerAccount WHERE id IN (<account ids retrieved by
    query (2)>)
```

FIGURE 3

DECOMPOSITION OF QUERIES

CROSS-REFERENCE TO RELATED APPLICATIONS

This Application is a continuation of and hereby claims priority under 35 U.S.C § 120 to pending U.S. patent application Ser. No. 15/417,809, filed on 27 Jan. 2017, the contents of which are incorporated herein in their entirety.

BACKGROUND

Field

Embodiments presented herein generally relate to techniques for generating a response to a query. More specifically, embodiments presented herein provide techniques for decomposing a query from a client device that requests data stored by multiple micro-services.

Related Art

Many application programming interfaces (APIs) assist developers in creating applications. However, problems arise using traditional APIs in a micro-service architecture. For example, a client application requesting data may not be aware of the location of the requested data. Thus, the client application may need to issue multiple requests or queries. For instance, assume a user stores invoices using an online service, such as QuickBooks online. Further, assume the provider hosting a distributed application stores data related to the invoices in different services. In such a case, the user may wish to find invoices that satisfy certain conditions as well as data related to those invoices. To do so, the client application may create a query that specifies what properties (or other data) of an invoice to evaluate and what to return for invoices that satisfy the conditions.

For example, the user may wish to find invoices that have associated contact objects with a display name like 'Greg.' The client application may create a query to fetch all invoices or only some invoices that meet this criteria. In response to the query, the client application may receive multiple invoice objects that each reference a contact. To obtain the content of a display name field of the contact objects, the client application would need to issue an additional query. The client application may also need to specify a filtering condition to select only those contact objects with a value in the display name field that is like 'Greg.'

As described above, in order to retrieve data stored in a collection of independent micro-services, a client application may need to issue multiple requests to obtain data related to a specific object. In response to a first request, the client application receives references to properties of the object. To obtain the property of the object, subsequent requests are made using the received references. In other words, the client application requests data from a first data source to get references to property of the object. Using the received references, the client application determines additional micro-services where the requested property may be located and issues a query to such micro-services. If the query returns another reference, the client application makes further requests until all data requested by the original query is obtained.

SUMMARY

One embodiment presented herein includes a method for decomposing a query. The method may generally include receiving a query from a client application and determining that data requested by the query is stored by a plurality of micro-services. For each micro-service, the method may include generating a micro-service query for data stored by that micro-service. The method may also include issuing each micro-service query to one of the micro-services, joining a response from each of the micro-services, and returning the joined response to the client application.

Another embodiment presented herein includes a computer-readable storage medium storing instructions, which, when executed on a processor, perform an operation to decompose a query. The operation may generally include receiving a query from a client application and determining that data requested by the query is stored by a plurality of micro-services. For each micro-service, the operation may include generating a micro-service query for data stored by that micro-service. The operation may also include issuing each micro-service query to one of the micro-services, joining a response from each of the micro-services, and returning the joined response to the client application.

Still another embodiment presented herein includes a system having a processor and a memory hosting an application, which, when executed on the processor, performs an operation to decompose a query. The operation may generally include receiving a query from a client application and determining that data requested by the query is stored by a plurality of micro-services. For each micro-service, the operation may include generating a micro-service query for data stored by that micro-service. The operation may also include issuing each micro-service query to one of the micro-services, joining a response from each of the micro-services, and returning the joined response to the client application.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 illustrates an example query and example output queries, according to one embodiment.

DETAILED DESCRIPTION

Figure 1:
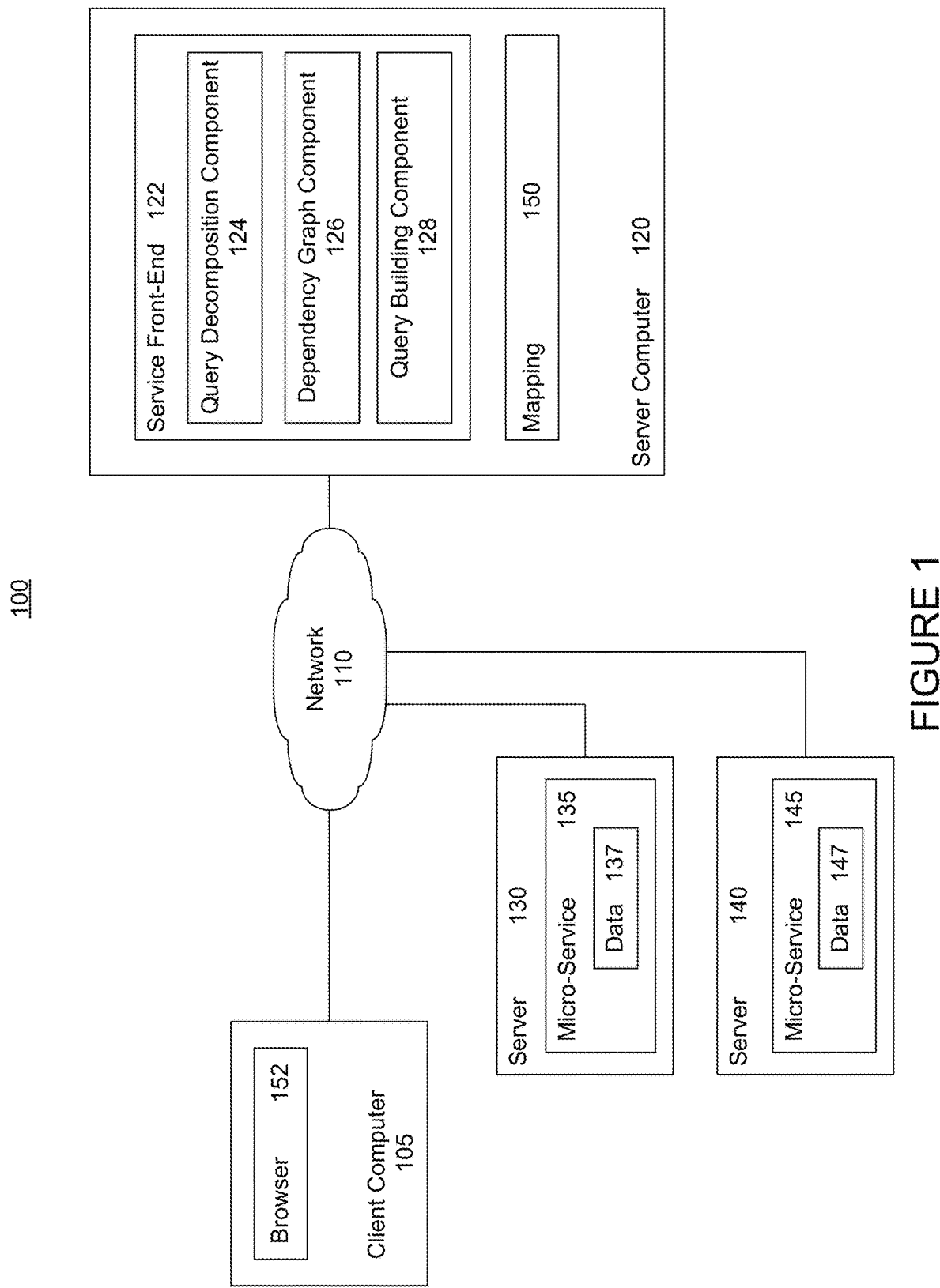
FIG. 1 illustrates an example computing environment, according to one embodiment.

Embodiments presented herein provide techniques for decomposing a query. More specifically, techniques presented herein provide techniques for generating multiple queries for data stored by multiple micro-services.

In one embodiment, a service front-end receives a query from a client application. The query from the client may be generated using a variety of API languages, e.g., GraphQL, SQL, and other API query languages. The service front-end may determine that data elements requested by the query are stored by multiple micro-services. In such a case, the service front-end may generate a query for each micro-service storing a data element requested by the query. The service front-end may determine an order to issue the micro-service queries to each micro-service. Upon receiving a response from each micro-service, the service front-end may assemble a response and return the response to the client application.

In one embodiment, the requested data elements may include both objects as well as relational and scalar properties of the objects. Scalar properties of an object are generally stored with the object itself. A relational property of an object represents a relationship between a micro-service for that object and another micro-service. Generally, a relational property of an object contains a foreign key to a micro-service that stores the object referenced by the relational property. For example, an invoice object may have scalar properties of amount, txnDate, and invoice.id. The relational properties of the invoice object may include an account associated with the invoice (e.g., 'account.id' is a foreign key to an Account micro-service and is stored with the invoice object) and a contact associated with the invoice (e.g., 'contact.id' is a foreign key to a Contact micro-service and is stored with the invoice object). An object ID is used as a way to de-reference the object from another micro-service. For example, if an invoice object has a relational property of 'contact' (of type Customer), the invoice object stores 'contact.id' as a foreign key to a Customer micro-service. Upon receiving a query, the service front-end may determine what object(s) and properties are requested.

In one embodiment, the service front-end generates a dependency graph based on the data elements requested by a query along with the query itself. The service front-end evaluates the dependency graph to determine a location of each requested data element and an order to retrieve each data element. In other words, the service front-end calculates a transitive closure of the dependency graph. For example, a query may contain a dependent section that uses results of a predicate section of the query. Thus, the predicate section is evaluated before the dependent section of the query. The dependency graph may be used to identify the dependency relationships and an order to evaluate each section of the query.

In one embodiment, the service front-end may determine that different micro-services store individual data elements requested by a query (or needed to evaluate data requested by a query). For example, an invoice object may contain a reference (i.e., a foreign key) to a contact object and an account object. The invoice, contact and account objects may each be stored in different micro-services. Upon determining the micro-services that store data requested by the query or data needed to evaluate the query, the service front-end may generate a query for each of the micro-services. For example, a 'displayName' of a contact may be stored by the contact micro-service while an 'accountNumber' may be stored by the account micro-service. To retrieve 'displayName' and 'accountNumber' the service front-end generates and sends a query to each micro-service. In some cases, the service front-end may generate an individual query for a large number of micro-services that store data elements requested by the query. Thus, the service front-end may generate individual queries as needed for each micro-service.

In one embodiment, upon receiving data from each micro-service, the service front-end removes data used to evaluate but not specifically requested by the query. The service front-end also joins the data received from the micro-services. That is, the data received from the micro-services is combined into a single response that can be sent to the client computer that issued the query. Once the receive data is joined, the service front-end may transmit the data to the client device.

FIG. 1 illustrates an example computing environment 100, according to one embodiment. As shown, the computing environment 100 includes a client computer 105, a network 110, a server computer 120, and servers 130, 140. Servers 130 and 140 each store a micro-service 135, 145, respectively.

As shown, the client computer 105 includes a browser 152 and server computer 120 includes a service front-end 122. The browser 152 may be used by a client to send a query to server computer 120. The query may be generated using a variety of API query languages, including GraphQL and SQL.

Micro-services 135, 145 each provide a different function and store different data 137, 147. For example, micro-service 135 may store data related to invoice objects in data 137 and micro-service 145 may store data related to contacts and associated account numbers in data 147. Micro-service 135 may be related to micro-service 145 in that the contact names in micro-service 145 may be associated with one or more invoices in micro-service 135. Thus, to obtain invoice objects related to a given contact name, a query is issued to micro-service 145 to find all contact names similar to the given contact name. For example, a query may be issued to micro-service 145 to return all contact names like 'Greg' (i.e., contact.displayName LIKE 'Greg'). In addition to the requested contact names, micro-service 145 may return a contact ID for each contact name. The contact IDs may be used, e.g., as part of an SQL IN filtering condition in a subsequent query to obtain invoice objects with a contact ID in a set of contact IDs returned by the previous query. Once the contact names are received, a query may be issued to micro-service 135 to obtain all invoice objects related to those contact names.

As shown, service front-end 122 includes a query decomposition component 124, a dependency graph component 126, and a query building component 128. The query decomposition component 124 may identify each data element (i.e., object and relational and scalar property) requested by the query. Query decomposition component 124 may also determine whether any predicate or dependent expressions exist in the query. A dependent expression contains a data element that is used to evaluate a predicate expression. That is, a predicate expression is evaluated before a dependent expression. Returning to the example of a user requesting invoice objects related to a given contact name, a request for all contact names like 'Greg' is a predicate expression. The request for all invoice objects related to the contact names like 'Greg' is a dependent expression because it uses the results of the predicate expression.

Dependency graph component 126 generates a dependency graph of the objects and properties requested by the query. The dependency graph may be used to determine an order to resolve each object and property in the query. For example, the dependency graph component 126 may determine to execute a predicate expression from the query before a dependent expression.

Dependency graph component 126 may also determine which micro-service should be queried for each object or property. That is, dependency graph component 126 may determine which micro-service stores a given object or property. To do so, dependency graph component 126 may evaluate the dependency graph for the given object or property. For example, the dependency graph may indicate that a property requested by the query is a property of a 'contact' object. Thus, that requested property is stored by a 'Contact' micro-service, such as micro-service 135 or 145. Mapping 150 may associate the given object or property with a respective micro-service. Thus, dependency graph component 126 may use mapping 150 to determine a micro-service that stores the given object or property.

Based on the location of each object or property, query building component 128 generates a query for each micro-service storing an object or property requested by the query. For example, micro-service 135 may store invoice objects and micro-service 145 may store contact names associated with the invoice objects in micro-service 135. To resolve a query from a client computer, such as client computer 105, for invoice objects associated with a contact name like 'Greg', micro-service 145 is queried to obtain ID values (i.e., contact.id) for contact names that are like 'Greg'. Micro-service 135 is then queried to obtain all invoices associated with the contact names obtained from micro-service 145. Query building component 128 may also generate a query for each predicate expression in the query.

Before results received from the micro-service queries are returned to the client computer 105, objects or properties not in the query from the client computer 105 may be filtered out of the received results. To do so, the query building component 128 determines which objects and properties of the received data are not requested by the query, and removes them from the received data. For example, service front-end 122 which executes a query that requests an account name of an invoice object may obtain an account ID in response to the query. However, if the query does not request the account ID, the query building component 128 of the service front-end 122 may remove the account ID from the received data so it is not sent as part of the response.

Figure 2:
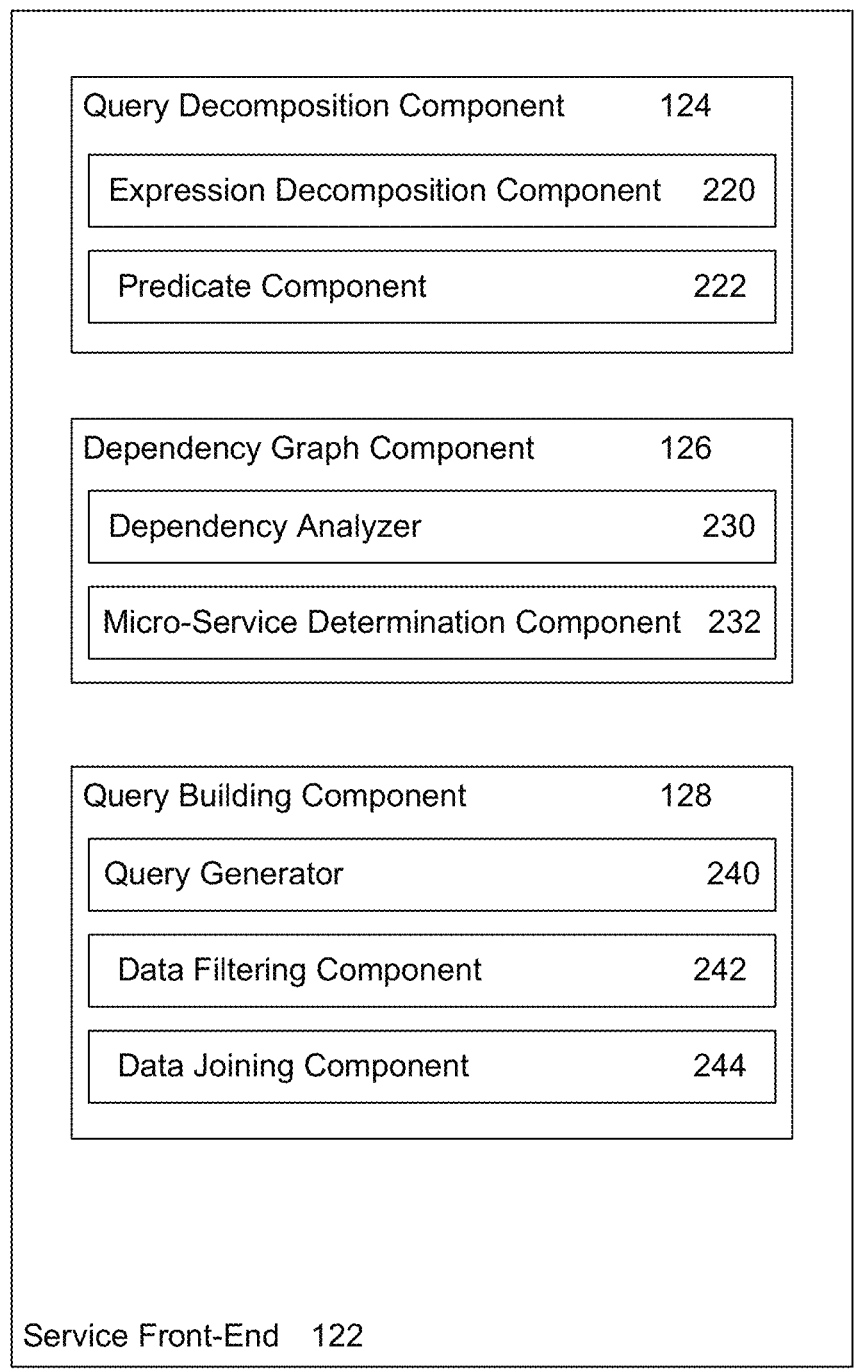
FIG. 2 illustrates an example service front-end configured to receive and decompose queries, according to one embodiment.

FIG. 2 illustrates an example service front-end 122 configured to receive and decompose queries, according to one embodiment. As shown, query decomposition component 124 includes an expression decomposition component 220 and predicate component 222.

Expression decomposition component 220 may identify individual data elements (i.e., objects and properties) requested by the query from client computer 105. For example, expression decomposition component 220 may identify properties related to an invoice object that include account.name, amount, contact.displayName, etc. Expression decomposition component 220 may identify data not explicitly requested by the query, but needed to evaluate the query. For example, the query may request an account name related to an invoice object. In evaluating the query, an account ID of the invoice object may need to be obtained (even though not requested by the query) and used to obtain the account name related to the account ID.

Predicate component 222 identifies conditional expressions in the query. That is, predicate component 222 identifies expressions that filter data returned for the query and whose output is used to evaluate another expression in the query.

As shown, dependency graph component 126 includes a dependency analyzer 230 and a micro-service determination component 232. Dependency analyzer 230 generates a dependency graph of all objects and properties requested by the query. The dependency graph is used to determine an order in which to resolve each object and property in the query. Micro-service determination component 232 identifies a micro-service that stores a given data element (i.e., object or property) requested by the query. To do so, micro-service determination component 232 may evaluate the dependency graph for the given object or property. For example, the query may request a property of a contact object (e.g., contact.displayName) related to an invoice object. Based on the dependency graph, the micro-service determination component 232 may determine that displayName is stored by a 'Contact' micro-service. Thus, to resolve the displayName property of the contact object, a query is sent to the 'Contact' micro-service.

As shown, query building component 128 includes a query generator 240, a data filtering component 242 and a data joining component 244. When the service front-end 122 receives a query requesting data from multiple micro-services, query generator 240 creates a query for each of those micro-services. Based on the order to resolve each object or property from the dependency graph, the query generator 240 determines an order to send the micro-service queries to the corresponding micro-services. For example, a query for a micro-service corresponding to a predicate expression in the query may be executed before a query corresponding to a dependent expression.

Upon receiving data from each micro-service, data filtering component 242 may identify and filter any portion of the received data that is not requested by the query. That is, data not requested by the query may be removed from the received data so it is not sent in response to the query. Once the data is filtered, data joining component 244 may combine the data received from each micro-service into a single response that can be sent to the client computer.

FIG. 3 illustrates an example query 300 and example output queries 330, according to one embodiment. As shown, the query 300 requests data related to an invoice object.

Upon receiving the query 300, an expression decomposition component identifies objects and properties requested by the query. For example, as shown in query 300, 'contact' and 'account' may be identified as relational properties of the invoice object; 'id,' 'amount' and 'txnDate' may be identified as scalar properties of the invoice object; 'displayName' may be identified as a scalar property of 'contact' (e.g., contact.displayName), and 'Name' is a scalar property of 'account' (e.g., account.Name).

A predicate component may identify predicate expressions in the query. For example, the predicate component may determine that the query 300 contains two predicate expressions. A first predicate expression of query 300 is "amount>100" which is a predicate against the invoice object. More specifically, the first predicate expression is a predicate against amount, a scalar property of the invoice object. A second predicate expression of query 300 is "contact.displayName like 'Greg'" which is a predicate against a contact micro-service. The second predicate expression is not a predicate against the invoice object.

Once the objects, properties and predicate expressions are identified, a dependency analyzer may generate a dependency graph of all objects and properties requested by the query 300. The dependency graph may be used to identify any objects or properties that are not requested by but are necessary to evaluate the query 300. For example, query 300 requests account.name. To obtain the property 'name' from the account object, an account ID (i.e., 'account.id') is first obtained from invoice objects as shown in query (2) in output queries 330. Thus, the dependency graph may identify 'account.id' as a property even though it is not request by the query 300.

A micro-service determination component may identify one or more micro-services that store the objects and properties requested by a query 300. To do so, the micro-service determination component may determine an object related to a given property. For example, 'displayName' is a scalar property of account as shown by 'contact.displayName' in query 300. Thus, the property 'displayName' is stored in a micro-service for the account object. As another example, amount is a scalar property of invoice. This is shown in query 300 by the predicate expression "amount>100" because this is a predicate against the invoice object. This is also shown in the first line of query 300 where the property 'amount' is to be selected from the invoice object.

A query generator may build a query for multiple micro-services based on the query 300. To do so, the query generator may receive input from the predicate component, the dependency analyzer and the micro-service determination component. For example, the query generator may receive a first predicate expression from the predicate component. As shown in the query 300, "amount>100" may be the first predicate expression, which is a predicate against the invoice object. Thus, the query generator builds a query against the invoice object for invoices with an amount property greater than 100 as shown by query (2) in output queries 330.

A second predicate expression from the predicate component may be "contact.displayName LIKE 'Greg'." The query generator may receive input from the dependency analyzer which indicates that 'displayName' is a scalar property of the contact object. Based on this input, the query generator builds a query against the contact object for contacts with "displayName LIKE 'Greg'" as shown by query (1) in output queries 330.

Similarly, the query generator may receive input from the dependency analyzer for each property in query 300 that is not part of a predicate expression. For example, the dependency analyzer may provide input that indicates 'txnDate' is a scalar property of the invoice object. Thus, the query generator may include 'txnDate' in query (2) against the invoice object as shown in output queries 330.

Once the query generator has received input and included each object and property requested by query 300 in an output query 330, the query generator sends each query to a corresponding micro-service which executes the query. For example, query (1) of output queries 330 is issued to and executed by a 'Contact' micro-service. Similarly, queries (2) and (3) are issued to and executed by an 'Invoice' micro-service and a 'LedgerAccount' micro-service, respectively.

Upon receiving data from each micro-service that executed an output query 330, a data filtering component may filter out one or more properties in the received data that was not requested by query 300. For example, the data filtering component may remove a property received from a micro-service that is identified as not requested by but necessary to evaluate the query 300.

Once the received data is filtered, a data joining component may join the data received from each micro-service into a single response and send that data to a client that issued the query 300.

Figure 4:
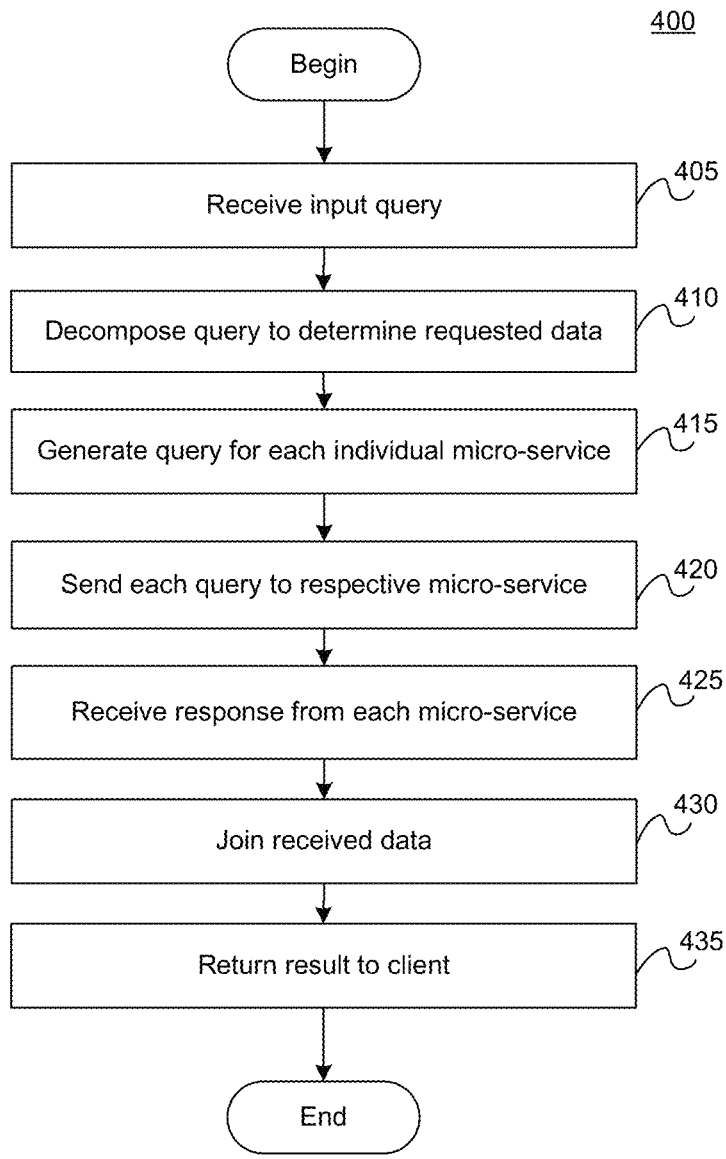
FIG. 4 illustrates a method for generating a response to a query, according to one embodiment.

FIG. 4 illustrates a method 400 for generating a response to a query, according to one embodiment. As shown, method 400 begins at step 405 where a service front-end receives a query from a client. The client may generate the query using a variety of query languages, e.g., GraphQL or SQL.

At step 410, the query is decomposed to determine the data requested by the query. To do so, an expression decomposition component may identify each object and property requested by the query. For example, the query may request data related to an invoice. The requested data may include an amount related to the invoice and a name of an account related to the invoice (e.g., 'account.name'). A dependency graph component may generate a dependency graph of each object and property requested by the query. The dependency graph may be used to determine an order in which each object and property is to be resolved. A micro-service determination component may determine a micro-service that stores each portion of the data requested by the query. For example, the micro-service determination component may identify 'displayName' as a scalar property of a contact object and determine that 'displayName' is stored by a 'Contact' micro-service.

At step 415, a query generator builds a query for each micro-service storing an object or property requested by the query. At step 420, the query generator may issue the built queries to the relevant micro-services. Once the queries are executed by the micro-services, a data filtering component receives a response from each micro-service.

The data filtering component identifies properties in the received data not requested in the query, but necessary to evaluate the query. For example, the query may request a scalar property of an account object called 'name' (i.e., 'account.name'). To obtain a value for this property, an account ID (i.e., account.id) is obtained from multiple invoice objects. The account ID is not requested by the query, but is necessary to evaluate the query. Thus, the data filtering component may remove account.id from the received data so it is not sent as part of a response to the query.

Once the received data is filtered, a data joining component combines the data from each micro-service at step 430. That is, the data joining component combines the received data into a single response to be sent to client that issued the query. At step 435, the response is returned to the client.

Figure 5:
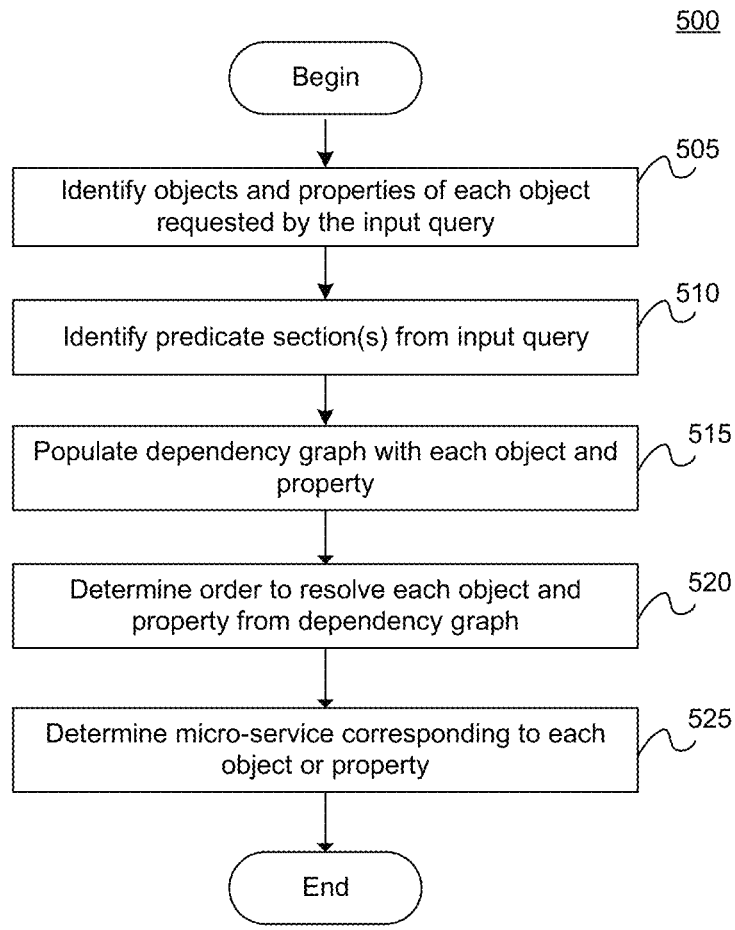
FIG. 5 illustrates a method to decompose a query, according to one embodiment.

FIG. 5 illustrates a method 500 to decompose a query, according to one embodiment. As shown, method 500 begins at step 505 where an expression decomposition component identifies objects and properties requested by a query. At step 510, a predicate component identifies predicate expressions in the query. That is, the predicate component identifies expressions that act as a filter against an object requested by the query. An output of a predicate expression may be used to evaluate another expression in the query.

At step 515, a dependency analyzer generates a dependency graph for each object and property requested by the query. The dependency graph may also include properties that were not requested by the query, but are necessary to evaluate the query, as discussed above.

At step 520, the dependency analyzer uses the dependency graph to determine an order to resolve each object and property. For example, an output of a predicate expression against an object may be used to resolve a scalar property of that object. Thus, the predicate expression is resolved against the object before the scalar property of the object is resolved.

At step 525, a micro-service determination component identifies a micro-service that stores each object and property in the dependency graph. For example, based on the dependency graph, the micro-service determination component identifies a 'Contact' micro-service as storing properties related to the contact object such as 'displayName' (e.g., contact.displayName).

Figure 6:
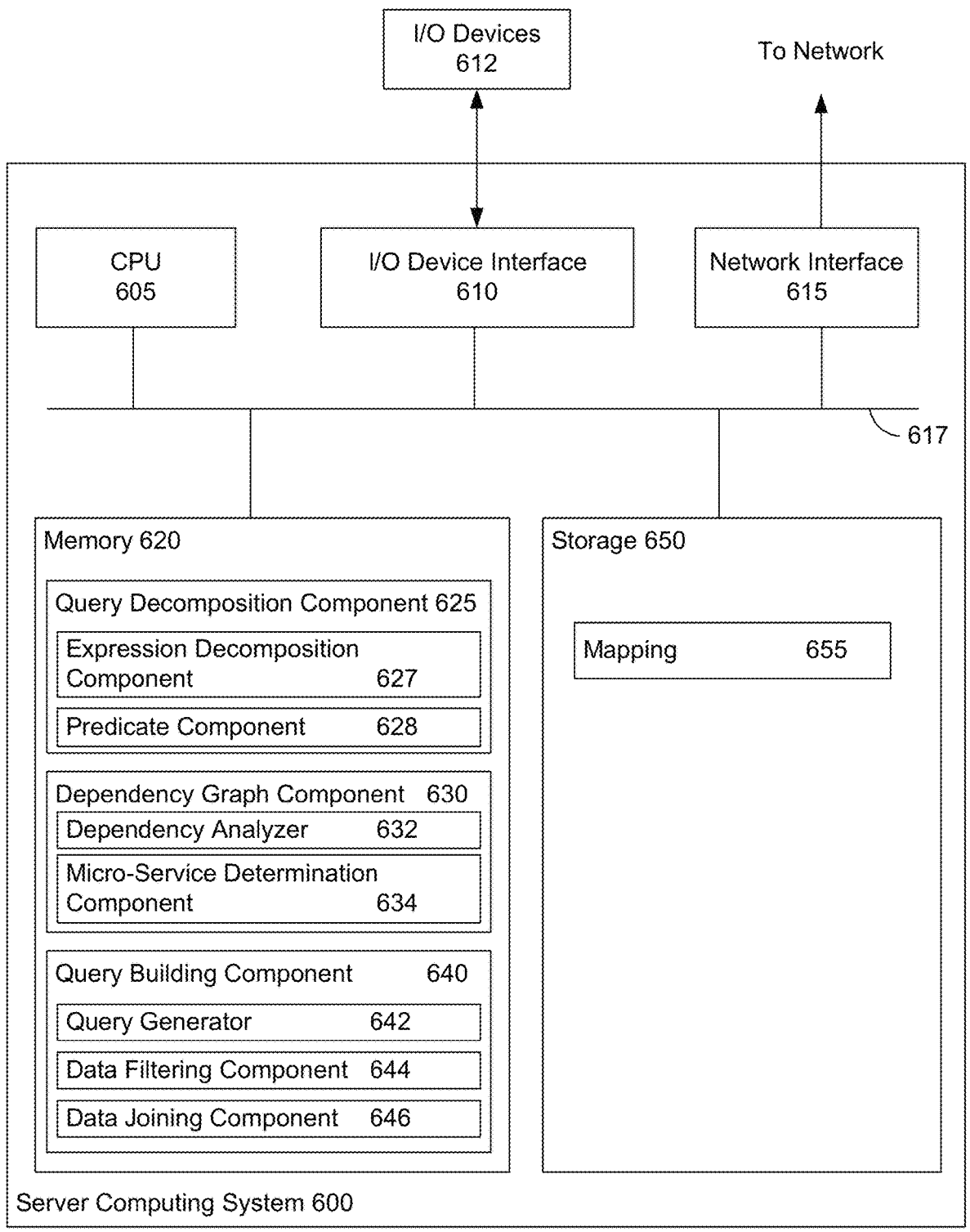
FIG. 6 illustrates an example computing system configured to decompose queries, according to one embodiment.

FIG. 6 illustrates an example computing system 600 configured to decompose queries, according to one embodiment. As shown, the computing system 600 includes, without limitation, a central processing unit (CPU) 605, a network interface 615, a memory 620, and storage 645, each connected to a bus 617. The computing system 600 may also include an I/O device interface 610 connecting I/O devices 612 (e.g., keyboard, display, mouse devices, image capture devices, etc.) to the computing system 600. Further, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stored in the storage 645. The bus 617 is used to transmit programming instructions and application data between the CPU 605, I/O device interface 610, storage 645, network interface 615, and memory 620. Note, CPU 605 is included to be representative of a single CPU, multiple CPUs, a single CPU having multiple processing cores, and the like, and the memory 620 is generally included to be representative of a random access memory. The storage 645 may be a disk drive or flash storage device. Although shown as a single unit, the storage 645 may be a combination of fixed and/or removable storage devices, such as fixed disc drives, removable memory cards, optical storage, network attached storage (NAS), or a storage area-network (SAN).

Illustratively, the memory 620 includes a query decomposition component 625 including expression decomposition component 627 and predicate component 628, dependency graph component 630 including dependency analyzer 632 and micro-service determination component 634, and query building component 640 including query generator 642, data filtering component 644 and data joining component 646. In certain aspects, these components may correspond to the components of the service front-end 122 described with reference to FIG. 2.

For example, expression decomposition component 627 may identify data elements requested by a query. Predicate component 628 may identify predicate expressions in the query. Dependency analyzer 632 generates a dependency graph including each object and property requested by the query. The dependency graph may be used to determine an order to resolve each object and query.

Micro-service determination component 634 may identify a micro-service that stores a given object or property based on the dependency graph. The micro-service determination component 634 may also use mapping 655 to determine a micro-service that stores the given object or property. Mapping 655 may associate a particular micro-service with the given object or property which the micro-service stores. Query generator 642 builds a query to be executed by each micro-service storing an object or property requested by the query.

Upon receiving data from each micro-service, data filtering component 644 may identify any object or property in the received data not requested by the query. Data filtering component 644 may remove those objects or properties from the received data so they are not included in a response to the query. Once the received data is filtered, data joining component 646 combines the data from each micro-service into a single response to be sent to a client that issued the query.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for decomposing a query, the method comprising:
    receiving a query from a client application based on a request provided by a user via a user interface associated with the client application;
    identifying a set of data elements requested by the query;
    identifying a predicate expression of a plurality of expressions in the query and a dependent expression of the plurality of expressions in the query, wherein the predicate expression is a first section of the query and the dependent expression is a second section of the query that involves a result of the first section of the query;
    generating a first micro-service query for at least a first data element corresponding to the predicate expression;
    generating a second micro-service query for at least a second data element corresponding to the dependent expression;
    determining an order for issuing the first micro-service query and the second micro-service query based on the predicate expression and the dependent expression;
    evaluating the plurality of expressions in the order by issuing the first micro-service query before issuing the second micro-service query;
    generating an aggregated response based on a first response to the first micro-service query and a second response to the second micro-service query; and
    returning the aggregated response to the client application.

2. The method of claim 1, wherein a mapping associates each respective data element with a respective micro-service.

3. The method of claim 1, wherein at least two different data elements are stored by one micro-service.

4. The method of claim 1, wherein the query from the client application is generated using an application programming interface (API).

5. The method of claim 1, further comprising:
    identifying a given data element in the second response used to obtain the second data element stored by another micro-service; and
    filtering the given data element from the aggregated response.

6. The method of claim 5, further comprising: determining that the given data element is not requested in the query, wherein filtering the given data element from the aggregated response is based on the given data element not being requested in the query.

7. The method of claim 1, wherein evaluating the plurality of expressions comprises requesting one or more data elements that are not requested in the query but are necessary to evaluate the query.

8. A non-transitory computer-readable storage medium storing instructions, which, when executed on a processor of a computing system, cause the computing system to perform an operation to decompose a query, the operation comprising:
    receiving a query from a client application based on a request provided by a user via a user interface associated with the client application;
    identifying a set of data elements requested by the query;
    identifying a predicate expression of a plurality of expressions in the query and a dependent expression of the plurality of expressions in the query, wherein the predicate expression is a first section of the query and the dependent expression is a second section of the query that involves a result of the first section of the query;
    generating a first micro-service query for at least a first data element corresponding to the predicate expression;
    generating a second micro-service query for at least a second data element corresponding to the dependent expression;
    determining an order for issuing the first micro-service query and the second micro-service query based on the predicate expression and the dependent expression;
    evaluating the plurality of expressions in the order by issuing the first micro-service query before issuing the second micro-service query;
    generating an aggregated response based on a first response to the first micro-service query and a second response to the second micro-service query; and
    returning the aggregated response to the client application.

9. The non-transitory computer-readable storage medium of claim 8, wherein a mapping associates each respective data element with a respective micro-service.

10. The non-transitory computer-readable storage medium of claim 8, wherein at least two different data elements are stored by one micro-service.

11. The non-transitory computer-readable storage medium of claim 8, wherein the query from the client application is generated using an application programming interface (API).

12. The non-transitory computer-readable storage medium of claim 8, the operation further comprising:
    identifying a given data element in the second response used to obtain the second data element stored by another micro-service; and
    filtering the given data element from the aggregated response.

13. The non-transitory computer-readable storage medium of claim 12, wherein the operation further comprises: determining that the given data element is not requested in the query, wherein filtering the given data element from the aggregated response is based on the given data element not being requested in the query.

14. The non-transitory computer-readable storage medium of claim 8, wherein evaluating the plurality of expressions comprises requesting one or more data elements that are not requested in the query but are necessary to evaluate the query.

15. A system, comprising:
    a memory comprising computer-executable instructions;

a processor configured to execute the computer-executable instructions and cause the system to perform an operation, the operation comprising:
  receiving a query from a client application based on a request provided by a user via a user interface associated with the client application;
  identifying a set of data elements requested by the query;
  identifying a predicate expression of a plurality of expressions in the query and a dependent expression of the plurality of expressions in the query, wherein the predicate expression is a first section of the query and the dependent expression is a second section of the query that involves a result of the first section of the query;
  generating a first micro-service query for at least a first data element corresponding to the predicate expression;
  generating a second micro-service query for at least a second data element corresponding to the dependent expression;
  determining an order for issuing the first micro-service query and the second micro-service query based on the predicate expression and the dependent expression;
  evaluating the plurality of expressions in the order by issuing the first micro-service query before issuing the second micro-service query;
  generating an aggregated response based on a first response to the first micro-service query and a second response to the second micro-service query; and
  returning the aggregated response to the client application.

16. The system of claim 15, wherein a mapping associates each respective data element with a respective micro-service.

17. The system of claim 15, wherein at least two different data elements are stored by one micro-service.

18. The system of claim 15, wherein the query from the client application is generated using an application programming interface (API).

19. The system of claim 15, the operation further comprising:
  identifying a given data element in the second response used to obtain the second data element stored by another micro-service; and
  filtering the given data element from the aggregated response.

20. The system of claim 15, wherein evaluating the plurality of expressions comprises requesting one or more data elements that are not requested in the query but are necessary to evaluate the query.

* * * * *